United States Patent [19]
Stricklin et al.

[11] Patent Number: 5,467,806
[45] Date of Patent: Nov. 21, 1995

[54] TWO-PART COUPLING STRUCTURE HAVING COOPERATING PARTS EFFECTING FLUID FLOW UPON CONNECTION AN MUTUAL RESEALING UPON DISCONNECTION

[75] Inventors: Douglas K. Stricklin, Brea; Chester Savage, Irvine, both of Calif.

[73] Assignee: Scholle Corporation, Irvine, Calif.

[21] Appl. No.: 240,978

[22] Filed: May 10, 1994

[51] Int. Cl.⁶ .................................................... F16L 37/28
[52] U.S. Cl. .................... 141/346; 141/348; 141/351; 137/614.04; 251/149.1
[58] Field of Search .................... 141/346–355, 141/10; 251/149.3, 149.6, 149.7, 149.1; 137/614.02, 614.03, 614.04

[56] References Cited

U.S. PATENT DOCUMENTS

| | | | |
|---|---|---|---|
| Re. 32,354 | 2/1987 | Savage | 222/81 |
| 2,254,997 | 9/1941 | Fisher | 137/614.03 |
| 2,568,516 | 9/1951 | Scheiwer | 251/149.6 |
| 3,417,781 | 12/1968 | Gregg | 137/614.04 |
| 3,422,864 | 1/1969 | Allinquant | 141/347 |
| 4,375,864 | 3/1983 | Savage | 222/81 |
| 4,445,551 | 5/1984 | Bond et al. | 141/349 |
| 4,696,411 | 9/1987 | Graf et al. | 220/281 |
| 4,948,014 | 8/1990 | Rutter et al. | 222/83 |
| 5,095,962 | 3/1992 | Lloyd-Davies et al. | 141/346 |
| 5,141,498 | 8/1992 | Christian | 604/167 |
| 5,211,197 | 5/1993 | Marrison et al. | 137/614.04 |
| 5,337,782 | 8/1994 | Wilcox | 137/614.03 |

*Primary Examiner*—J. Casimer Jacyna
*Attorney, Agent, or Firm*—Poms, Smith, Lande & Rose

[57] ABSTRACT

A two-part coupling structure includes a male coupling part and a female coupling part which are mutually engageable to open fluid communication between a fluid-storage vessel and a conduit. The coupling parts are disengageable from one another to discontinue fluid communication between the vessel and the conduit, and also to close communication between ambient and each of the vessel and conduit. The retention volume of fluid which is trapped between the connected male and female coupling parts and which is exposed to or lost to ambient when the coupling parts are disconnected is very small. Because of particular structural features, the coupling parts will function reliably even with fluid having chunks or particulates of non-fluid material therein.

35 Claims, 7 Drawing Sheets

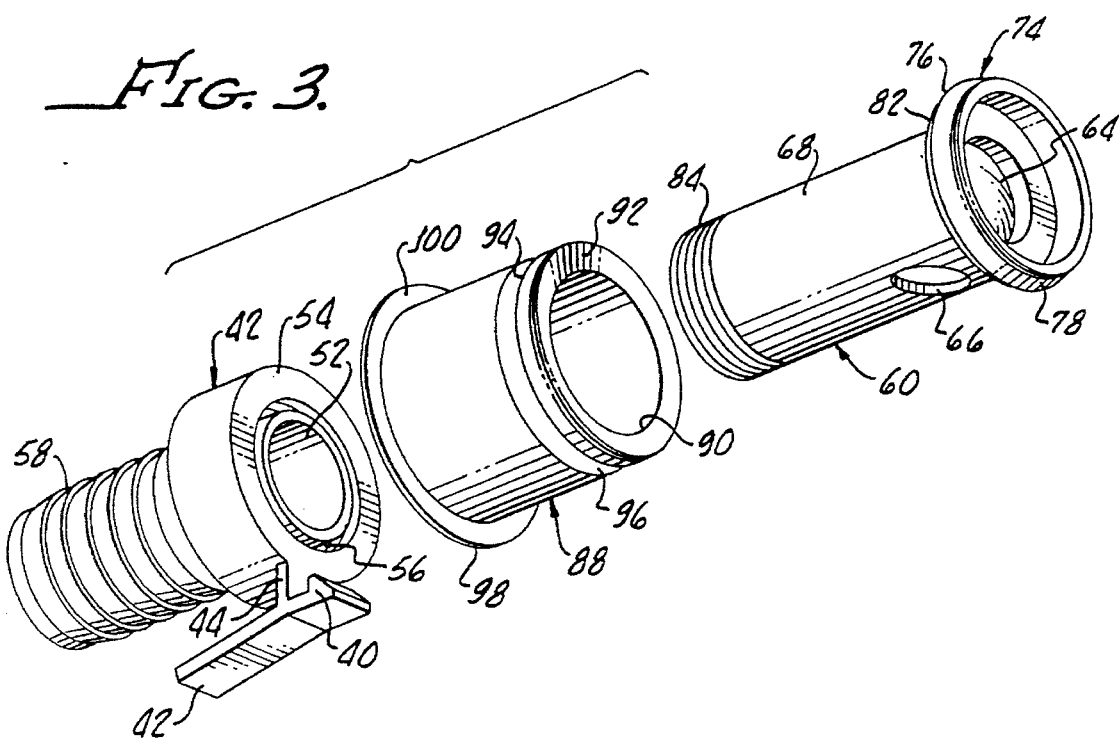

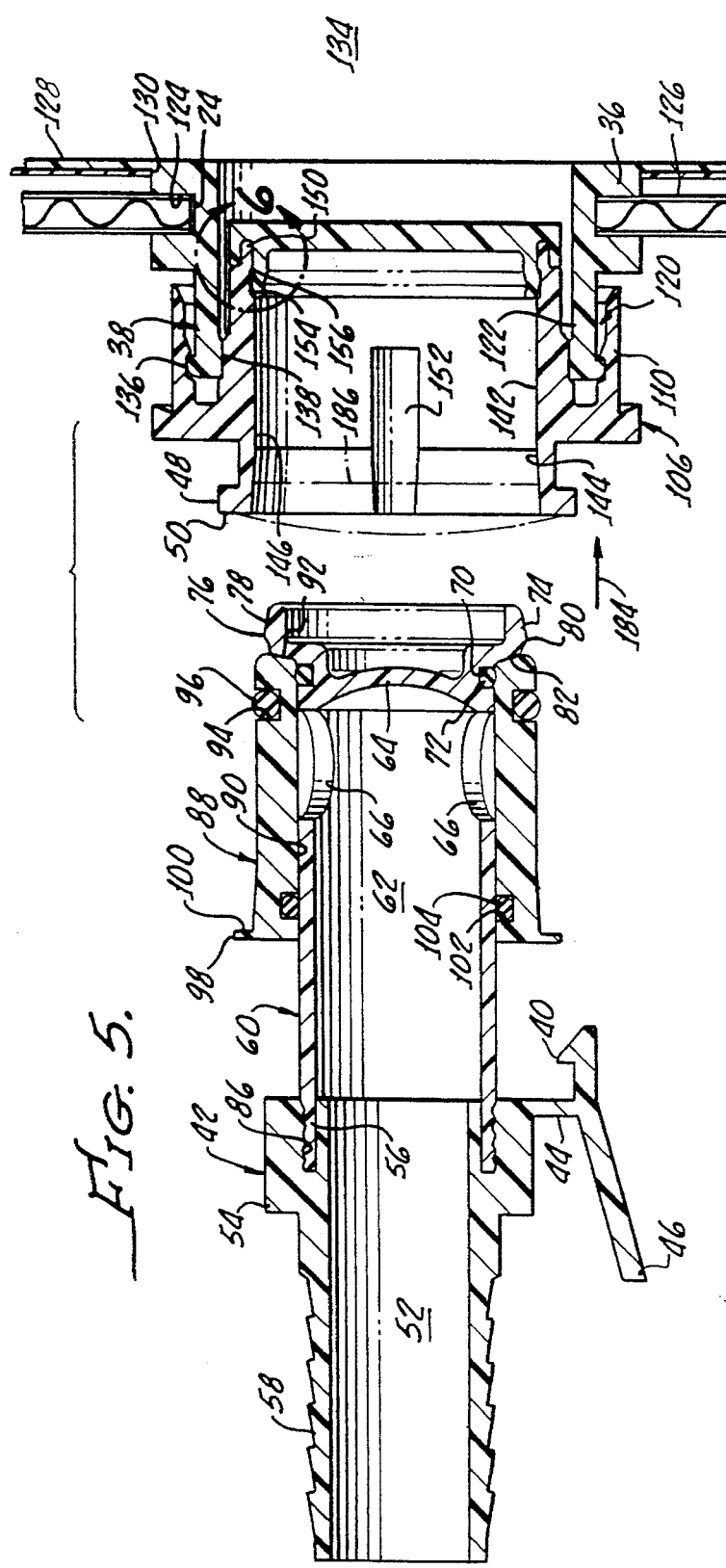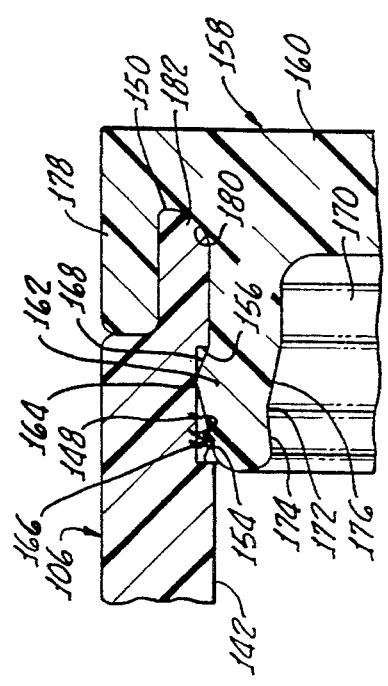

TWO-PART COUPLING STRUCTURE HAVING COOPERATING PARTS EFFECTING FLUID FLOW UPON CONNECTION AN MUTUAL RESEALING UPON DISCONNECTION

BACKGROUND OF THE INVENTION

1. Field of the Invention

The present invention is in the field of fluid flow couplings. More particularly, the present invention relates to those types of fluid flow couplings which include a first, or male, part and a second, or female, part, which when these parts are connected to one another effect fluid flow communication therebetween. When the coupling parts are so connected they may be used to effect fluid flow connection between a fluid-holding vessel and a fluid flow conduit, for example. When the coupling parts are disconnected from one another they mutually or individually reseal so that fluid is not lost either from the conduit or from the vessel. Additionally, this type of coupling desirably has a minimal retention volume of fluid which is not sealed either in the conduit or in the vessel upon disconnection of the coupling parts, and which is thus released into or exposed to ambient conditions.

2. Related Technology

Conventional coupling structures are known in accord with U.S. Pat. Nos. 4,375,864 (Re 32,354); and 4,445,551. In the first instance, the coupling structure includes an adaptor connected to a storage vessel and defining an opening sealed by a movable plug. A tubular probe is receivable sealingly in the adaptor to remove the plug from sealing engagement with the adaptor and to carry this plug inwardly of the vessel as the probe moves inwardly of the adaptor to open fluid communication between the vessel and a conduit communicating with the probe. Upon withdrawal of the probe from the adaptor, the plug is carried back into sealing engagement with the adaptor. The probe carries a quantity of retained fluid, but communication of fluid from the conduit to the ambient is prevented by a check valve internal to the probe.

With the coupling structure disclosed by the '551 patent, a service coupling portion includes a plug valve member which is movable between a first position in which this plug valve member closes communication with a storage vessel, and a second position in which a pair of lateral outlets moves inwardly of the storage vessel to permit fluid communication between this vessel and the outer portion of the service coupling. A connector member portion defines a through axial passage and is sealingly engageable with the plug valve to lock therewith and then to move the plug valve member axially from its first position to its second position. When the connector member portion is withdrawn from the service coupling, the plug valve is first drawn from its second position to its first position to close the vessel, and then the connector member portion unlocks from the plug valve to allow completion of the withdrawal of the connector member portion from the service coupling. With this coupling structure, the service coupling portion and connector member portion retain a considerable volume of fluid which is either lost to or exposed to the ambient when the portions of the coupling structure are disconnected. Also, flow of fluid from the conduit communicating with the connector member portion and to the ambient is not prevented when the coupling structure is disconnected.

Other conventional coupling structures are known in accord with U.S. Pat. Nos. 4,948,014; and 5,095,962. The first of these two coupling structures includes a spout member connecting to a storage vessel, such as a fluid-filled bag. A socket member is engageable with the spout member to connect the vessel to a conduit in fluid flow communication. The spout is a tubular body with an internal resiliently-biased tubular valving member which is axially biased at a valving surface thereon into sealing relation with a valve seat defined by an annular end wall of the spout member. Similarly, the socket member is a cup-shaped member receivable sealingly over the spout and including a poppet valve member axially biased resiliently into sealing engagement with a valve seat disposed at the closed end of the cup-shaped socket member. The socket member connects in fluid flow relationship with a conduit. A stem of the poppet valve member extends into the open center of the cup-shaped socket. When closed, the valve structure of the socket closes communication of ambient with the conduit.

When the socket and spout of the '014 coupling structure are engaged with one another, the stem of the poppet valve engages an end wall of the tubular member to force both of these members out of sealing engagement with their respective valve seats. Thus, the vessel is communicated with the conduit of the socket member. Upon disconnection of the socket member and the spout member, only a relatively small volume of fluid is retained to be exposed to or lost to ambient. However, with a coupling structure according to the '014 patent, both the socket and the spout members are complex and relatively costly components to manufacture. Further, the complexity of these components increases the manufacturing costs for this coupling structure by increasing both the inspection costs and scrap rates for this coupling structure.

A coupling structure according to the '962 patent includes a tubular spout attached to and in fluid communication with a fluid filled vessel, such as a bag. This spout portion includes a plug member sealing disposed for axial movement between a first position closing fluid communication between the vessel and an outer portion of the spout member, and a second position opening this fluid communication.

A valve member is slidably engageable axially into sealing relation with the spout at the plug member of this spout portion. The valve member communicates with a conduit and includes an internal plug valve. The plug valve internally resiliently engages a valve seat of the valve member to close communication of fluid from the conduit. Engagement of the valve member with the plug member of the spout opens the plug valve of the valve member. Further axial movement of the valve member into the spout member unseats the plug member and moves it to its second position so that the vessel is communicated with the conduit.

When the valve member and spout member of the '962 coupling are axially disengaged from one another, only a very small volume of fluid is retained outwardly of the valve member and spout. This retention volume of fluid is very small because the valve member defines a domed end surface, and the plug member has a matching contoured end wall closely fitting to the valve member. Lateral ports of the plug member are themselves of small volume, and the passage leading to the plug valve member of the valve member itself is small and is mostly filled by the plug valve member itself when this plug valve moves to its closed position. Consequently, this coupling structure has only a small volume of fluid which is retained therein upon disconnection of the component parts of the coupling structure.

Generally, coupling structures of the type discussed above are employed to connect a fluid-filled bag to a receiver for the fluid. The fluid-filled bag may contain a food product. For example, the fluid may be syrup of the type which is mixed with carbonated water to make soft drinks. The receiver for the fluid in this case would be a soft drink dispenser. Thus, it is seen that the fluid dispensed is a food product which could be contaminated by exposure to bacteria and soil in the environment. Also, when the parts of such coupling structures are disconnected, loss of such a food-product fluid to the ambient results in unsanitary conditions around the storage vessel. This may be the case at the food preparation and dispensing facilities of a restaurant or hotel, for example. Thus, the importance of such coupling structures having a small, or preferably zero, retained volume of fluid upon disconnection of the coupling parts is easily appreciated.

However, many food products which are of fluid, semifluid, or paste-like consistency, such as salad dressings and other condiments, for example, also contain pieces or chunks of various foods and spices. These pieces might be chopped pickle, chopped onion, pepper, or chunks of such food items as cheese or other food materials, as well as particles of such things as spices, for example. Other fluid, semi-fluid, and paste-like food products may contain other kinds and other consistencies of chunks or particulate of various food ingredients and spices. These chunks and particulate present a special problem and difficulty when it is desired to dispense such food products in bulk from a vessel, such as a fluid-filled bag, by use of the conventional couplings. That is, the chunks and particulate of food may lodge in and jam the various parts of the conventional coupling structures. The valving features of these conventional coupling structures also may not close securely when the fluid contains chunks and particulate of food. The result of this failure to function properly with the conventional coupling structures may be the leakage or contamination and spoilage of food product, as was discussed above. Also, if either of the coupling portions fails to close properly when the coupling is disconnected, the loss of food product may create unsanitary conditions and attract insects and vermin to the food preparation area of a hotel or restaurant, for example.

SUMMARY OF THE INVENTION

Accordingly, in view of the deficiencies of the related technology a need exists for a coupling structure which will reliably connect and disconnect a fluid source with a fluid receiver even when the fluid includes pieces, chunks, or particles.

Still further, a need exists for such a coupling structure which is of low or zero retained volume when the components of the coupling are disconnected from one another.

An object for this invention is to provide a coupling structure which will function properly with a fluid having pieces, chunks, or particles in the fluid.

Another object for this invention is to provide such a coupling structure which has a minimal volume of fluid retained outwardly on the components of the coupling when these components are disconnected from one another.

Accordingly the present invention provides a two-part coupling structure comprising a female coupling part having a tubular cap member defining a through bore which forms a first fluid flow path for communicating with a vessel; and a plug member defining a wall portion for spanning and closing the through bore; the cap member and the plug member defining first cooperating means for removably attaching to one another in response to a first axial force so that the plug member wall closes fluid communication through the cap member and for disengaging from one another in response to an oppositely directed second axial force to free the plug member allowing fluid flow through the first fluid flow path of the cap member bore; a male coupling part having a elongate tubular probe member sealingly receivable axially into the through bore of the cap member, the probe member defining a second fluid flow path therein which also opens laterally on an exterior surface of the probe member for communicating fluidly with the vessel, the probe member and the plug member defining second cooperating means for removably attaching to one another in response to a third axial force in the same direction and of lower level than the second axial force, and for disengaging from one another in response to a fourth axial force in the same direction as the first axial force, so that in response to forceful axial insertion of the male coupling part into the female coupling part the probe member engages with and attaches to the plug member prior to the plug member detaching from the cap member, and in response to axial withdrawing movement of the probe member from the cap member the plug member reattaches to the cap member prior to disengaging from the probe member; a sleeve member which is carried on the probe member and sealingly engageable within the cap member, the sleeve member sliding along the probe member between a first position across and closing the lateral opening of the flow path and a second position opening the flow path of the probe member; the sleeve member and the probe member defining cooperating frictional means for retaining the sleeve member in each of the first and the second positions; and the sleeve member and the cap member defining cooperating means for sliding the sleeve member to the second position thereof in response to insertion of the male coupling part into the female coupling part to open the flow path communication with the vessel, and for sliding the sleeve member from the second position to the first position thereof to close the flow path in response to withdrawal of the male coupling part from the female coupling part.

These and additional objects and advantages of the present invention will be apparent from a reading of the following detailed description of an exemplary preferred embodiment of the invention taken in conjunction with the appended drawing Figures, which are described briefly immediately below.

BRIEF DESCRIPTION OF THE DRAWING FIGURES

FIG. 1 provides a somewhat schematic perspective view of a fluid dispensing system including a fluid-filled vessel connected to a fluid conduit by a coupling structure embodying the invention;

FIG. 2 is an enlarged perspective view of a portion of the fluid-filled vessel with a coupling structure according to the present invention in which the coupling structure is shown with the coupling parts disconnected from one another;

FIGS. 3 and 4 provide respective exploded perspective views of the male (probe and sleeve) coupling parts, and of the female (cap and plug) coupling parts, of the present exemplary embodiment of the invention;

FIG. 5 provides a fragmentary cross sectional view of the coupling parts preparatory to connection of these parts, or subsequent to disconnection of the parts;

FIG. 6 is a greatly enlarged fragmentary cross sectional view of an encircled portion of FIG. 5;

Figure 7:
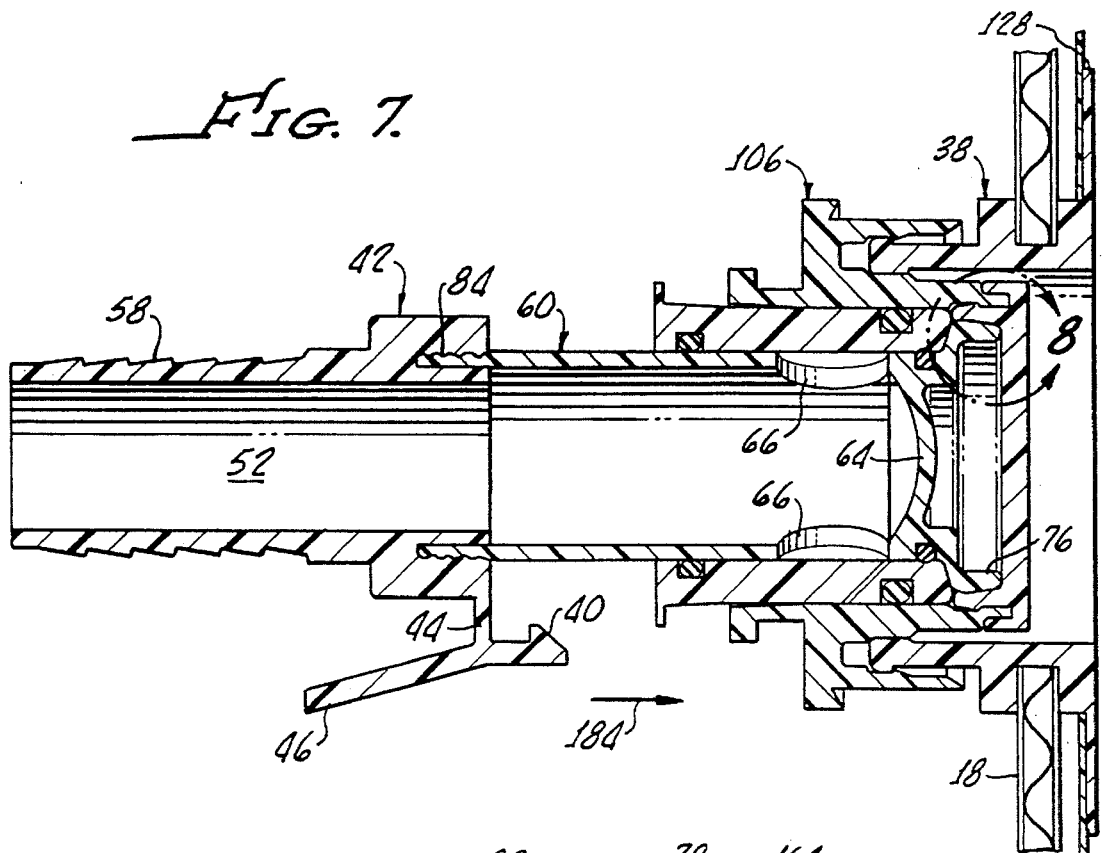
FIG. 7 illustrates a fragmentary cross sectional view similar to that of FIG. 5, but showing the parts of the coupling structure in a relative position which they can occupy during connection or disconnection of the parts.
Figure 8A:
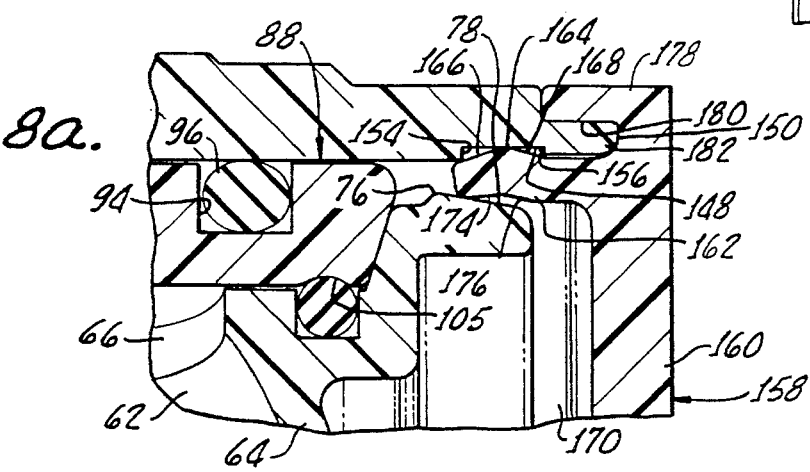
Figure 8B:
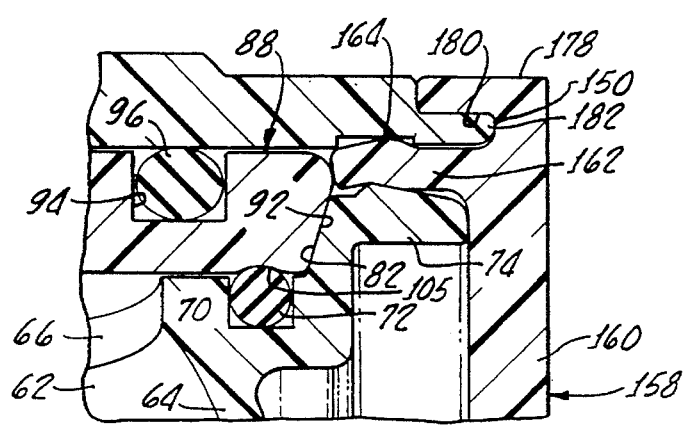
Figure 9:
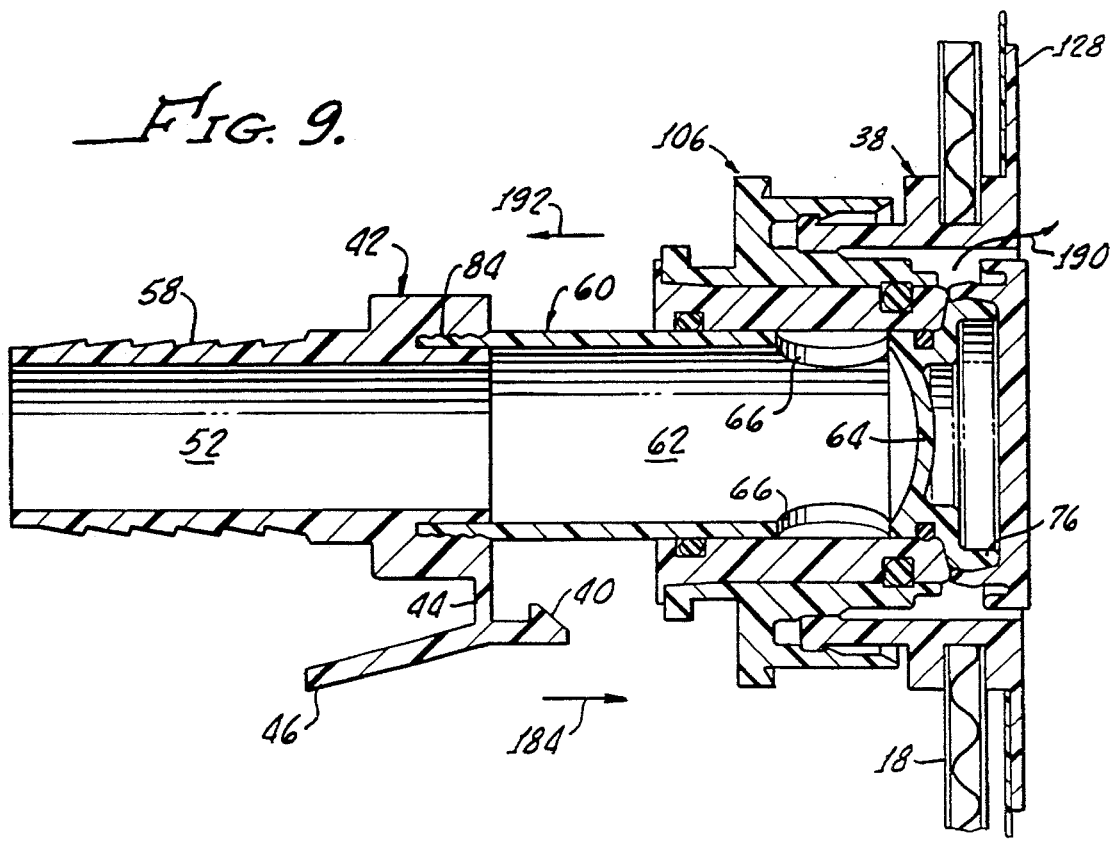
Figure 10:
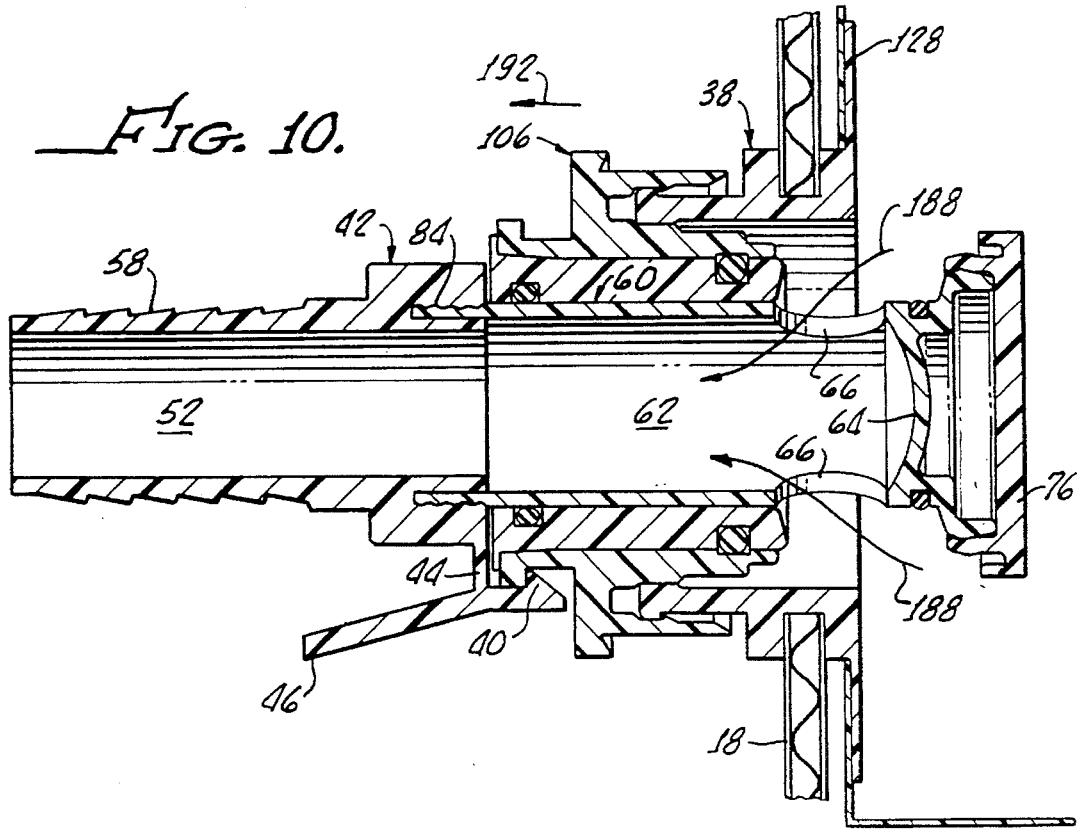
Figure 11:
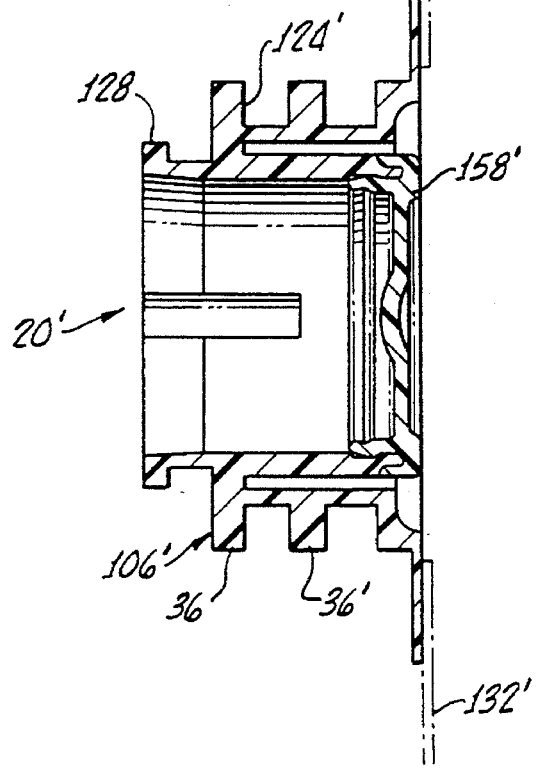
Figure 12:
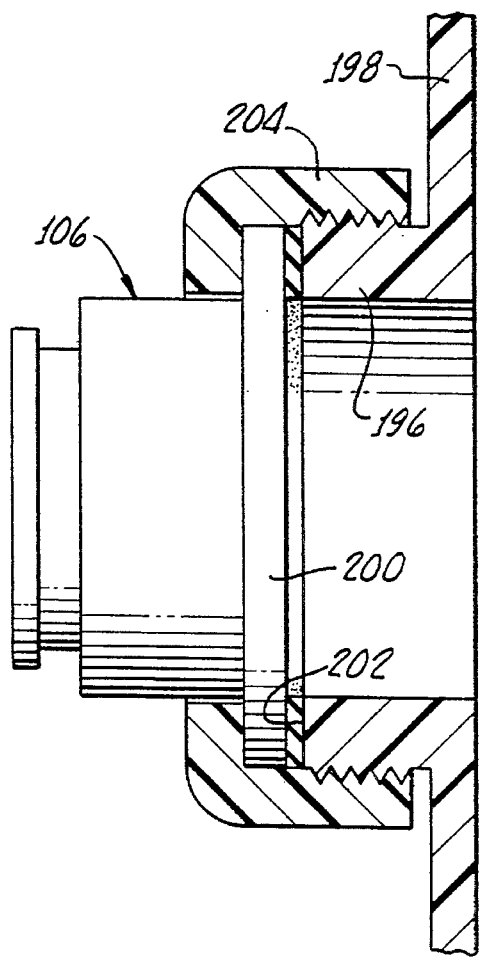
Figure 13:
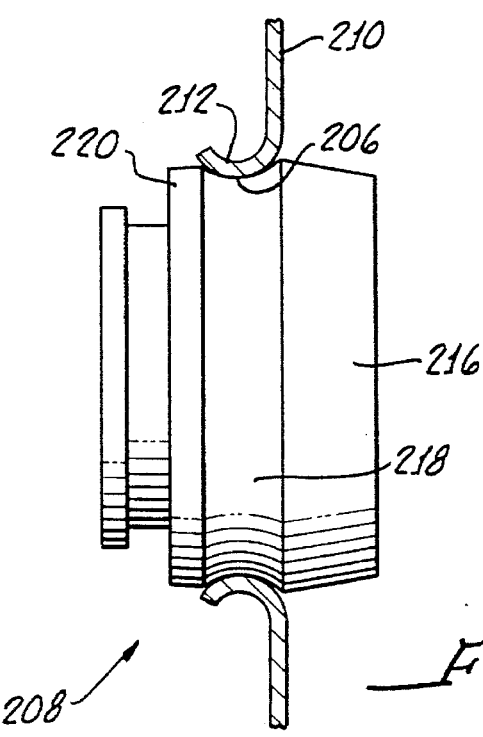
Figure 15:
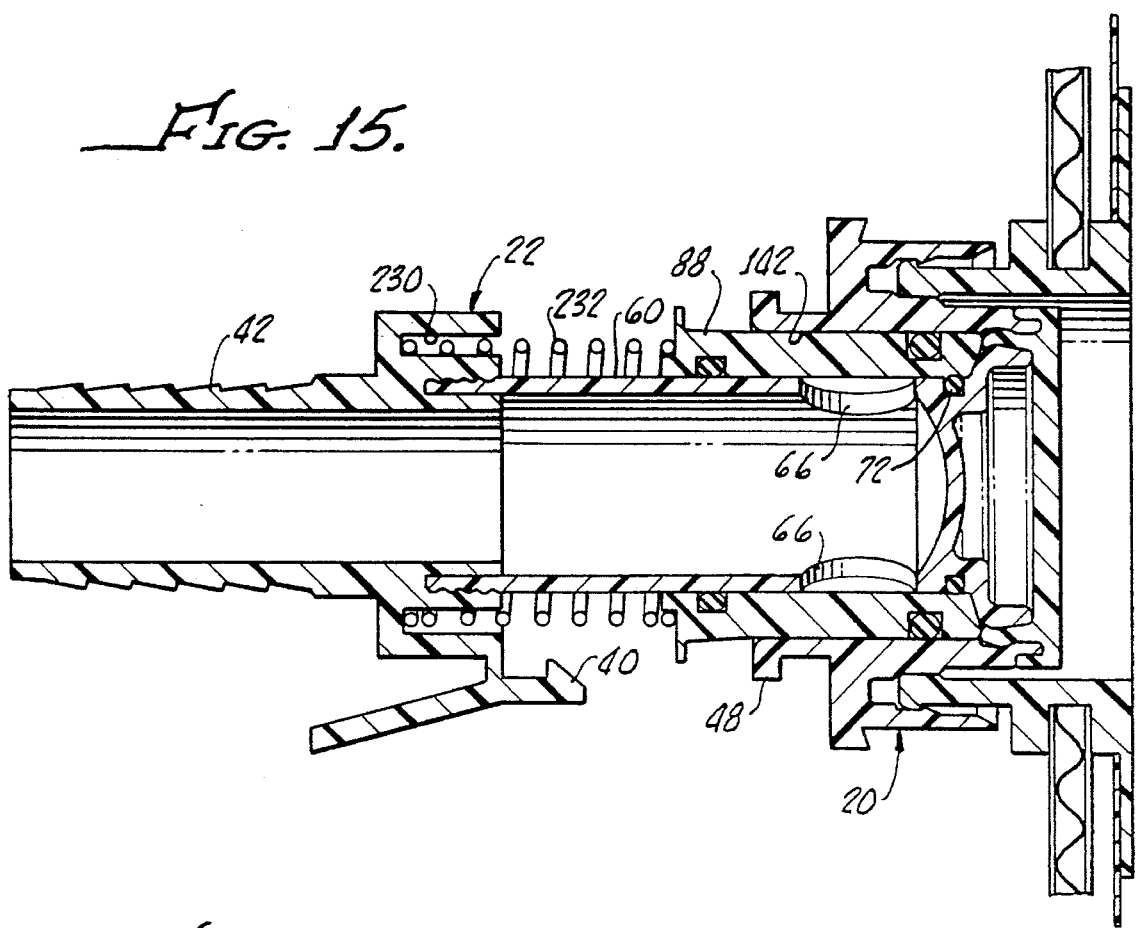
Figure 14:
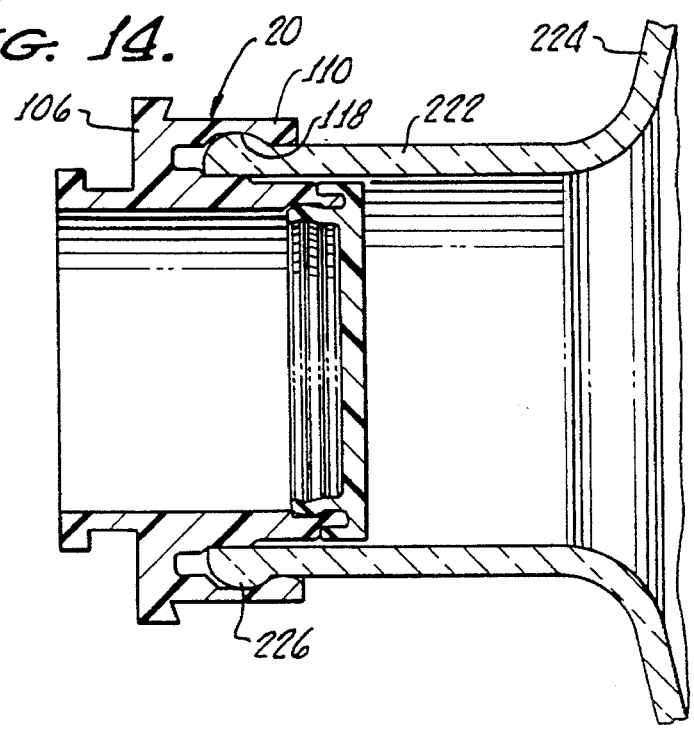

FIGS. 8a and 8b, respectively, are greatly enlarged fragmentary cross sectional views preparatory to and in the relative position depicted in an encircled portion of FIG. 7;

FIG. 9 provides a cross sectional view of the coupling parts in a relative position which they may have during connection or disconnection of the coupling parts;

FIG. 10 is a cross sectional view with the coupling parts shown in their fully-engaged relative positions allowing fluid flow through the coupled coupling parts;

FIG. 11 provides a fragmentary cross sectional view similar to a part of FIG. 5, but showing an alternative embodiment of the female coupling part;

FIG. 12 shows an exterior view of yet another alternative embodiment of the female coupling part of the present invention, with a vessel to which this coupling part is connected shown in fragmentary cross sectional view;

FIG. 13 provides a fragmentary cross sectional view of still another alternative embodiment of the female coupling part of the present invention shown installed in a metallic diaphragm, such as in the head of a metal drum;

FIG. 14 is a fragmentary cross sectional view of another alternative embodiment of the female coupling part of the present invention, snapped into sealing engagement with a conventional rigid walled bottle; and FIG. 15 provides a cross sectional view similar to FIG. 5, but showing only the male coupling part of an alternative embodiment of the present invention.

DETAILED DESCRIPTION OF AN EXEMPLARY PREFERRED EMBODIMENT OF THE INVENTION

Figure 1:
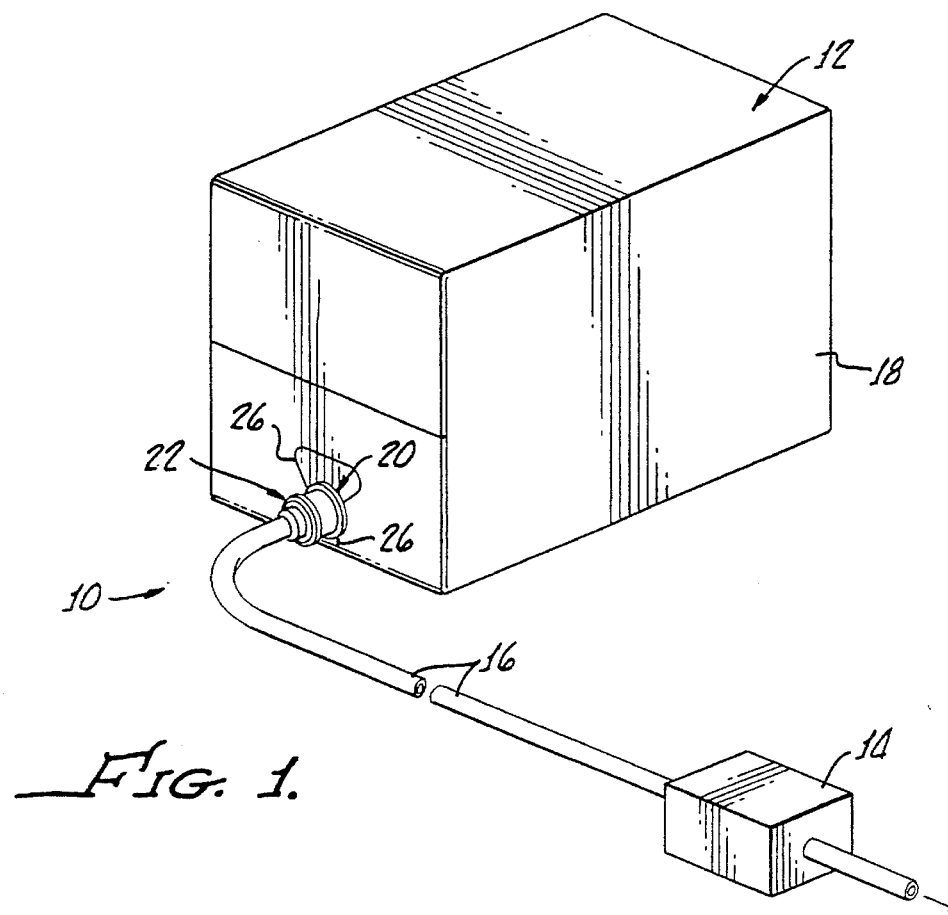
Figure 2:
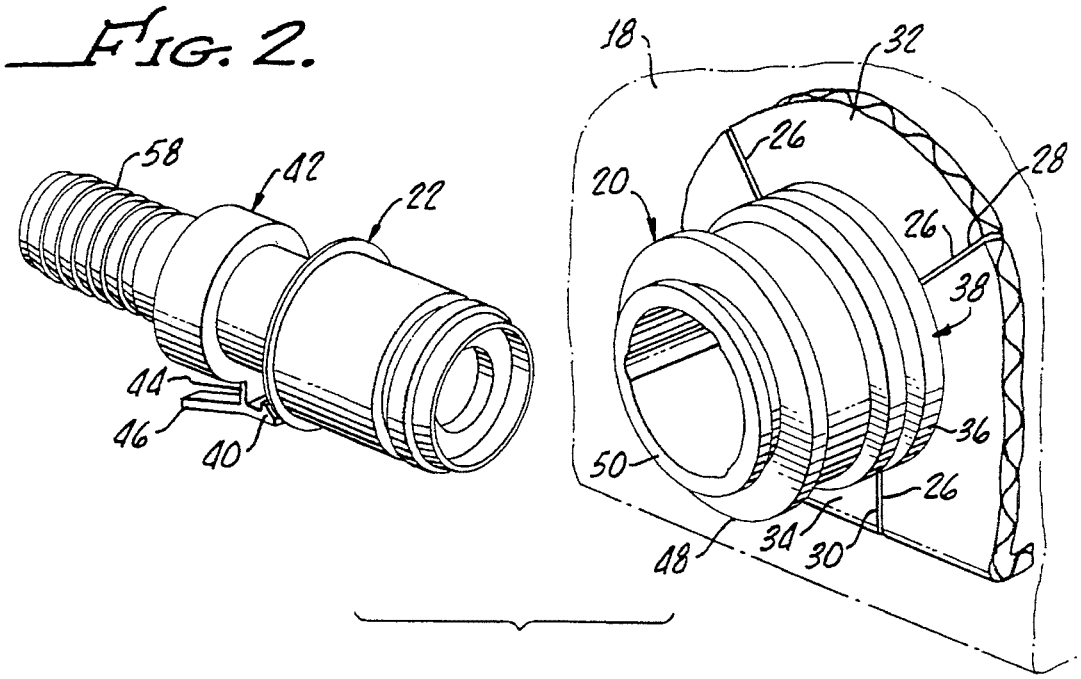

Viewing FIG. 1, a liquid fluid dispensing system 10 is schematically depicted. This dispensing system 10 includes a liquid-filled vessel 12, which is connected to a dispensing pump 14 by a conduit 16. The vessel 12 may be of any desired construction, but the illustrated vessel is of the bag-in-box configuration. This vessel 12 includes an outer shape-retaining box 18 of corrugated paper board and an inner flexible bag (not visible in FIG. 1), which is fabricated of plastic sheet. As FIG. 2 illustrates, the vessel 12 carries a female coupling part 20 (hereinafter sometimes referred to as a cap and plug assembly). The female coupling part 20 closes access to the liquid contents of the vessel 12 until a male coupling structure part 22 (hereinafter sometimes referred to as a probe and sleeve assembly) is connected with the female part 20. The male coupling part 22 provides fluid flow connection of liquid from the respective vessel 12 to the conduit 16 and pump 14 for effecting controlled dispensing of the liquid. Each of the female and male coupling parts (20 and 22, respectively) is principally fabricated of a somewhat yieldable, but generally shape-retaining polymer material.

As those ordinarily skilled in the pertinent arts will appreciate, the components of the coupling parts 20 and 22 may be made by an injection molding process. This method of fabricating the components of the coupling parts has the advantage of making the couplings of such low cost that the female coupling part may be thrown away with a disposable bag-in-box container, or with other types of containers which are not recycled. Alternatively, when used with a recyclable container, such as one of glass or durable plastic, the container is cleaned, refilled, and reused. However, the female coupling part 20 is of such low cost that it may be discarded for sanitation reasons. The male coupling part 22 is useable over a period of time with several different female coupling parts 20 on several successive vessels 12 for dispensing the fluid contents of these vessels.

FIG. 2 also shows that the paper board box 18 defines a hole 24 (best seen in FIG. 5) surrounded by several short radiating slits 26. The slits 26 cooperatively define both an upper slot 28 and a diametrically opposed lower slot 30, both of which have respective tabs 32, 34. The tabs 32 and 34 are movable into and out of these slots by bending of the paper board material of the box 18 to allow the female coupling part 20 to be inserted into and locked in place within the hole 24. That is, the slits 26 allow the female coupling part 20 to be inserted from inside of the box 18 outwardly through the hole 24 so that a pair of spaced apart and radially outwardly extending flange portions 36 (only one of which is seen in FIG. 2) of a spout member 38 (best seen in FIG. 5) are trapped respectively inwardly and outwardly of the hole 24 of the box 18. A portion of this spout member 38 extends outwardly of the box 18 to sealingly hold the female coupling part 20 in place, while also communicating the female coupling part 20 with the fluid contents of the vessel 12.

FIG. 2 shows also that the male coupling part 22 includes a locking pawl portion 40. This pawl 40 is molded in unit with a hose barb member 42 of the male coupling part 22 (as will be further described below) so that an integral flexible hinge portion 44 of the hose barb member 42 provides both resilience and a necessary range of possible movement for the pawl portion 40. The pawl portion 40 is provides with a manually-operable lever feature 46 so that the pawl portion 40 can be disengaged manually from a circumferential flange 48 which is defined by the female coupling part 20 at an outer end edge 50 thereof. The pawl portion 40 is engageable with this flange 48 upon insertion of the male coupling part 22 into the female coupling part 20 to ensure against accidental disconnection of these coupling parts.

In view of the above, it will be understood that when one vessel 12 is empty, the conduit 16 may be disconnected from this vessel by separating the associated coupling parts 20 and 22. A new full vessel 12 is then substituted for the empty one. As will be seen from a reading of the following description taken in conjunction with the drawing Figures, the coupling parts 20 and 22 are configured and function individually and in cooperation with one another so that connection to a vessel 12, disconnection from a vessel 12, and reconnecting the conduit 16 to a new full vessel, all may be done simply, quickly, and without spillage of liquid from either vessel. Also, leakage of liquid from within the disconnected conduit 16 is avoided, while the retention volume of liquid carried on the outside of the male coupling part 20 as well as at the disconnected female coupling part 22 is virtually nil.

Turning now to FIGS. 3–6 in conjunction with one another, and viewing first FIG. 3 for a consideration of the male coupling part 22, it is seen that this male coupling part 22 includes the hose barb member 42. This hose barb member 42 is an elongate, generally tubular body defining a through passage 52 surrounded at one end (as seen in FIG. 3) by a radially thickened portion 54 in which is defined an annular axially extending recess 56. At the opposite end (away from the viewer of FIG. 3), the hose barb member 42 outwardly defines a conventional hose barb section 58 for connection with a flexible hose portion (shown in dashed lines in FIG. 5) of conduit 16.

The male coupling part 22 also includes a probe member 60, which is also an elongate, generally tubular body having an axial passage 62 (best seen in FIG. 5) closed by an arcuate wall 64 near a forward end of the probe member (as is seen by a viewer of FIG. 3). The passage 62 communicates outwardly of the probe member 60 via a pair of diametrically opposite side apertures 66 opening on a cylindrical outer surface 68 of the probe member 60. Distally of the apertures 66, that is, toward the nearer forward end of the probe member 60 as seen by a viewer of FIG. 5, the probe member 60 defines an annular groove 70 into which is fitted an O-ring type of sealing member 72.

Further forward of the groove 70, the probe member 60 includes an enlarged diameter flange portion 74, which is generally L-shaped as seen in cross section (viewing FIG. 5). The flange portion 74 includes a radially outer circumferentially extending rib 76, which is defined by the cooperation of a forwardly tapering surface 78 and a rearwardly tapering surface 80. As will be explained, the taper angles of the two taper surfaces 78 and 80 are preferably not the same, and are different by amounts of taper sufficient to effect the functional cooperation of the female and male coupling parts, 20 and 22 respectively, of the coupling structure.

Because of the flange portion 74, the probe member 60 is stepped on its outer diameter, and the flange portion 74 cooperates with the remainder of the probe member 60 to define a slightly tapering rearwardly disposed circumferential shoulder 82 (best seen in FIG. 5). At the end of probe member 60 adjacent to the hose barb member 42 (as seen in FIG. 3), the probe member 60 defines a thread section 84. FIG. 5 shows that the probe member 60 and the hose barb member 60 are threadably united by insertion of the thread section 84 into the recess 56 into engagement with a female thread section 86 defined by the hose barb member 42. Preferably, an adhesive or solvent bonding may be employed at first assembly of the hose barb member 42 with the probe member 60 so that the male coupling part 22 is permanently assembled as a unitary assembly. Alternatively, the hose barb member 42 and the probe member 60 could be united by a snap-fit (i.e., by cooperating radial groove and radial ridge features) at the locations of the threads 84 and 86, and in place of these threads. Still alternatively, adhesive or solvent bonding alone may be sufficient to unite the hose barb member and probe member.

FIGS. 3 and 5 also show that the male coupling part 22 includes a relatively thick-walled tubular sleeve member 88 defining a through bore 90. Bore 90 is sized so that the sleeve member 88 can be received to slidably move closely over the outer cylindrical surface 68 of the probe member 60. The sleeve member 88 is trapped on the probe member 60 of the male coupling part 22 when this coupling part is first assembled. In other words, the sleeve member 88 is captively received slidably on the probe member 60 between the hose barb member 42 and the enlarged diameter flange portion 74 of this probe member 60. At a forward end, the sleeve member 88 defines an end edge surface 92 which is slightly recessed conically to match the slight taper of the shoulder 82 on the probe member 60. Spaced from the end edge surface 92, the sleeve member 88 defines a radially outwardly opening circumferential groove 94 into which is fitted an O-ring type of sealing member 96.

The sleeve member 88 at an end thereof opposite the end edge surface 92 includes an outwardly radially extending flange portion 98. This enlarged diameter flange portion 98 cooperates with the remainder of the sleeve member 88 to define a shoulder 100. Near this opposite end of the sleeve member, and on the bore 90, is defined a radially inwardly opening groove 102 for carrying an O-ring type of sealing member 104 (best seen viewing FIG. 5). The O-ring 104 will sealingly engage the surface 68 when the sleeve member 88 is carried on the probe member 60. Also, the O-ring 104 frictionally engages the surface 68 so that the sleeve member 88 is not freely movable axially along the probe member 60. More importantly, the sleeve member 88 defines a shallow circumferentially extending and radially inwardly opening groove 105 (best seen in FIGS. 8a and 8b) which is aligned with and partially receives the O-ring sealing member 72 in the first or closed position of the sleeve member 88 relative to the probe member 60. This cooperation of the O-ring sealing member 72 in the groove 105 forms a resilient retention or detenting of the sleeve member in its first position. However, this resilient retention of the sleeve member 88 can be overcome upon connection of the coupling parts, as will be seen.

FIG. 5 also shows that in a first or disconnected position of the sleeve member 88 on the probe member 60, the sleeve member spans and closes the apertures 66. Distally of the apertures 66, the O-ring 72 sealingly engages the sleeve member 88 at the bore 90, and proximally of the apertures 66. The O-ring 104 sealingly engages the outer surface 68 of the probe member 60. Consequently, the passage through the male coupling part 22, which is cooperatively defined by the passages 52 and 62 of the hose barb member 42 and probe member 60, is effectively closed so far as fluid communication into or out of this passage is concerned. As a result, when the male coupling part 22 is disconnected from the female coupling part 20, leakage of fluid from the conduit 16 to the environment is prevented. Also, contamination can not enter the conduit 16 via the coupling part 20, viewing FIG. 5.

FIGS. 4–6 depict the female coupling part 20 in greater detail. FIGS. 4 and 5 show that the female coupling part 20 includes a sleeve-like cap member 106. The member 106 is referred to as a cap member because it is configured for use as described herein in conjunction with a bag-in-box storage vessel 12, and also conceivably could be used as a cap to close the neck of a conventional rigid and shape-retaining bottle (not shown). That is, the cap member 106 includes a circumferentially extending radially and axially thickened portion 108 from which rearwardly extends a circumferential skirt 110. A radially outer surface 112 of the cap member, and radially inner surface 114 of the skirt portion 110, each define a respective one of a pair of respectively radially outwardly and radially inwardly opening circumferential recesses, 116 and 118. The surfaces 112 and 114 also cooperatively define an axially extending annular recess 120 into which a tubular neck portion 122 of the spout member 38 is sealingly receivable, viewing FIG. 5.

As FIG. 5 shows in greater detail, the spout member 38 includes the pair of flanges 36, which are spaced apart to define a circumferential groove 124 into which a part of the corrugated paperboard wall 126 of the box 18 around the opening 24 is receivable. Inwardly of the groove 124, the spout member 38 defines a radially outwardly extending flange portion 128. This flange portion 128 is used to effect a thermal or ultrasonic circumferential sealing weld of the spout member 38 into a hole 130 defined by the flexible plastic bag 132 within box 18, as is seen in FIG. 5. This plastic bag 132 defines a chamber 134 which is the fluid holding feature of the vessel 12, as previously described with reference to FIG. 1. The tubular neck portion 122 of the spout member 38 defines radially inwardly and radially outwardly disposed ridges, 136 and 138, respectively, which sealingly engage with the recesses 116, 118 of the cap member 106 when this cap member is snapped onto the spout 38, as is seen in FIG. 5. When the cap member 106 is snapped onto the spout member 38, a passage 140 of the spout member communicates the chamber 134 of the bag 132 with the cap member 106.

Cap member 106 also defines a through bore 142, which includes an entrance taper section 144 of slight conical taper, and a cylindrical section 146 of constant diameter with the exception of a radially inwardly disposed circumferential groove 148 on this bore section near an inner end 150 of the cap member 106. An elongate venting groove 152 extending along the inner surface of the bore 142 represents a further exception to this cylindrical shape of the bore 142. The circumferential groove 148 includes a forward radially extending wall 154, and a rearward radially extending wall 156. Each of the walls 154, and 156 may be angulated relative to a truly radial direction of the bore 142, as is indicated in FIG. 6, and each surface 154, 156 may have a different degree of angulation with respect to the radial direction.

Carried within (and partially around) the cap member 106 is a disk-like plug member 158, viewing FIGS. 4–6. This plug member 158 includes a wall portion 160, which closes the bore 142 of the cap member 106 when the plug member 158 is engaged with the cap member 106, as is depicted in FIG. 5. The plug member 158 includes also an axially forwardly extending ring portion 162. The ring portion 162 is received into the bore 142 of the cap member 106 in a closed position of the plug member 158 on cap member 106, as depicted in FIG. 5. Outwardly, this ring portion 162 defines a radially outwardly and circumferentially extending ridge 164, which is formed by the cooperation of a forward taper surface 166 and a rearward taper surface 168. As is depicted in FIG. 5 and 6, when the plug member 158 is sealingly carried on the cap member 106, the ridge 164 is received into groove 148. In this closed position for the plug member 158, the taper surface 166 confronts wall 154 and the taper surface 168 confronts wall 156, viewing FIG. 6.

Inwardly, the ring portion 162 defines an axially extending cavity 170 and a radially inwardly opening groove 172, which is defined by the cooperation of a forward taper surface 174, and of a rearward taper surface 176. Radially outwardly and axially of the inner end 150 of the cap member 106, the plug member 158 includes an L-shaped skirt section 178. This L-shaped skirt section 178 cooperates with the remainder of the plug member 158 to define an annular recess 180. An end portion 182 of the cap member 106 rearwardly of the groove 148 is received into the annular recess 180, and is supported by the skirt section 178 as the plug member 158 is moved axially into and out of engagement with the cap member (as will be explained) to assist in controlling the axial forces necessary to effect these engagement and disengagement movements.

Viewing now FIGS. 5–8, and FIG. 5 first of all, it will be recalled that the coupling parts 20 and 22 may be axially engaged with one another, as is indicated by the arrow 184 viewing FIG. 5. Depicted in dashed lines in FIG. 5 is a removable protective cap member 186. This protective cap member is received into the bore 142 of the cap member 106 to prevent entry into the female connector part 20 of soil and contamination. Prior to connecting the male coupling part 22 with the female coupling part 20, the protective cap 186 is removed and discarded.

The probe member 60 and sleeve member 88 assembly as shown in FIG. 5 enters first the tapering entrance section 144 of the bore 142, and then travels along the cylindrical section 146. As pointed out above, the O-ring 104 frictionally grips the probe member 60 so that the sleeve member 88 does not freely slide along the probe member, but can be moved axially with the application of a certain axial force. This required axial force is greater than that required to slide the O-ring 96 into and along the bore 142. During this movement of the probe member 60 into the bore 142, the vent groove 152 allows trapped air to escape so this air is not pressurized to dislodge the plug member 158 from its engagement on the cap member 106.

As FIG. 8A shows, upon the forward end (flange portion 74) of the probe member 60 arriving at the plug member 158, the forward taper surface 78 engages the ring portion 162 of the plug member 158. Because of the chosen taper angle for the surface 78, the enlarged diameter flange portion 74 of the probe member 60 will enter the cavity 170 defined by the ring portion 162 so that rib 76 snaps into groove 172 without dislodging the plug member 158 from its sealing engagement with the cap member 106, viewing FIG. 8B. This is especially the case because the plug member 158 is outwardly supporting the portion 182 of the cap member 106 by the engagement of the L-shaped skirt section 178 with this end portion. Consequently, the ridge 164 is not easily dislodged from the groove 148.

However, as FIG. 9 shows, additional axial movement of the male coupling part 22 into the female coupling part 20 after full engagement of the probe member 60 into the plug member 158 will dislodge this plug member 158 from the cap member 106. The plug member 158 is then carried on the enlarged diameter flange portion 74 of the probe member 60 inwardly of the vessel 12. This additional inward axial movement of the probe member 60, as is also indicated with the arrow 184 on FIG. 9, brings the sleeve member 88 into abutment at the shoulder 100 of its flange 98 with the cap member 106. This abutment stops further inward movement of the sleeve member 88. Simultaneously, the O-ring 96 snaps slightly outwardly into the now-vacant groove 148 to both maintain a seal with the cap member 106, and to act as a resilient retention member locating the sleeve member 88 relative to the cap member 106.

FIG. 10 shows that further axially inward movement of the male coupling part 22 relative to the female coupling part 20 (arrow 184) results in the probe member 60 moving into the vessel 12 so that the apertures 66 move inwardly of the cap member 106. This movement of the apertures 66 inwardly of the cap member 92 opens fluid communication between the vessel 12 (that is, with the contents of the bag 132 in chamber 134 in this case) and the conduit 16, as is depicted by the fluid flow arrow 188. Inward motion of the probe 60 is stopped when the hose barb member 42 engages the sleeve member 88 and the pawl 40 locks with the flange 48 to prevent unintended disengagement of the coupling parts 20 and 22, viewing FIG. 10.

With a bag-in-box dispensing system venting of ambient air into the chamber 134 of the vessel 12 is not required because the flexible bag 132 simply collapses as the fluid contents are withdrawn from this bag. However, when the cap member 106 is attached to a rigid container, such as a glass or plastic bottle, venting of air into the container may be effected either via the conduit 16 or by a separate venting connection (not shown) which will allow pressure equalization between the contents of the vessel 12 and the ambient.

When the male coupling part 22 is to be disconnected from the female coupling part 20, the user of the dispensing system 10 will manually depress the lever 46 to disengage pawl 40 from flange 48. Thereafter, an axial pull outwardly on the male coupling part 22 will effect disconnection of the two coupling parts and re-closing of both the male and female coupling parts. Virtually no retention volume of food product fluid will be left on the exposed outside surfaces of either the male or female coupling parts. However, a consideration of the drawing Figures generally in the reverse order to their discussion above will be helpful in understanding the sequence of discreet events which take place during this disconnection of the coupling parts 20 and 22.

Considering FIG. 9, it is seen that as the probe member 60 is withdrawn out of the female coupling part 20, the sleeve member 88 is retained in its illustrated position by the engagement of the O-ring 96 in groove 148. That is, the axial force necessary to withdraw sleeve member 88 from the cap member 106 is increased by the engagement of O-ring 96 in groove 148 so that this withdrawal force exceeds the frictional grip of the O-ring 104 on the probe member 60. This axial retention force for the O-ring 96 also exceeds the axial force necessary to re-engage the sleeve member 88 over the O-ring 72. Consequently, the O-ring 72 re-enters the groove 105 to resiliently retain the sleeve member 88 in its first position. The apertures 66 are re-closed by the sleeve 88 as the end surface 92 acts as a scraper to remove food product liquid from the surface 68. The food product liquid which is scrapped from the surface 68 of the probe member 60 is squeezed between the surfaces 92 and 82, and is squeezed out of the progressively closing annular space between these surfaces, as is indicated by the arrow 190 on FIG. 9.

When the enlarged diameter portion 74 of the probe member 60 contacts the sleeve member 88, and the probe member is further moved axially in a withdrawal direction, indicated by the arrow 192 on FIG. 9, the sleeve member 88 will begin moving toward its position seen in FIG. 7. That is, the axial force will overcome the resilient retention of O-ring 96 in groove 148. The outer diameter of the ring portion 162 of plug member 158 generally agrees with the outer diameter of the sleeve member 88, viewing FIG. 9, so that food product liquid is excluded from the area between these members. Upon the plug member 158 reengaging the cap member 106, the forward taper surface 166 engages the now unsupported end portion 182 of the cap member 106 and enters into the bore portion 146 with a relatively low resistance. The ridge 164 can snap into the groove 148 without dislodging the plug member 158 from the end of the probe member 60. In other words, the retention force of plug member 158 on the probe member 60, as is determined by the cooperations of surfaces 80 and 174, exceeds the axial force necessary to engage the plug member 158 into the bore 142, as is determined by the surface 166 acting on the end portion 182.

FIG. 8B shows that when the plug member 158 does engage into groove 148 with ridge 164, there is virtually no trapped volume between the two coupling parts 20 and 22 into which retention volume of food product liquid can be trapped. It is seen that the small retention volume which is formed at the groove 148 is indicated with the arrowed numeral 194. The total of this retention volume is insignificant compared to the retention volumes of conventional couplings.

FIG. 5 shows that with further outward withdrawing motion of the male coupling part 22, as is indicated by the arrow 192, the coupling parts separate to their relative positions and conditions first depicted and described by reference to this drawing FIG.. As thus disconnected, the vessel 12 may be removed and replaced with another similar full vessel preparatory to reconnecting the male coupling part 22 with the female coupling part 20 of the new vessel.

With a coupling structure and bag-in-box container as depicted in FIG. 5, it will be apparent that the chamber 134 of the bag container 132 may be filled before the cap member 106 is snapped onto the spout 38. That is, the bag 132 is placed into the box 18 with the spout 38 extending outwardly through the hole 24. The food product may be dispensed through the spout 38 into the chamber 134 to fill the bag 132, after which the cap member 106 is placed on the spout 38. In this condition, the protective cap 186 is placed into the outer end of the bore 142, and the entire female coupling assembly 20 is placed inside of the opening 24 of the box 18 so that it is protected during shipping and handling of the food product.

FIGS. 11–13 depict alternative embodiments of the invention, which are the same in all respects as the embodiment depicted and described with reference to the above drawing Figures with the one exception of the configuration of the cap member. In FIGS. 11–13 alternative configurations for the cap member are illustrates which adapt the coupling members for use with different kinds of containers. In particular, the female coupling member is adapted to use on different kinds of containers by changes in the configuration of the respective cap member. In order to obtain reference numerals for use in describing the structure depicted in FIGS. 11–13, features which are the same or which are analogous in structure or function to features described above are indicated with the same referenced numeral used above and having one or more primes added thereto as may be necessary to distinguish analogous parts from one another.

FIG. 11 depicts a cap member 106' which integrally includes both the pair of spaced apart flanges 36' cooperatively defining the groove 124', and the radially outwardly extending flange portion 128'. After the plug member 158' is united with the cap member 106' during manufacture of this type of female coupling member 20', the female coupling member may then be heat sealed to a bag 132'. This configuration of the cap member 106' does not require the use of the separate spout member 38 as described above for filling of the bag 132'. However, bag-in-box containers with this type of cap member 106' will necessarily be filled by use of a male coupling member which is connected to the female coupling member 20' on the bag 132'.

FIG. 12 depicts an alternative cap member 106", which is configured for use on the externally-threaded neck 196 of a conventional bottle type rigid-walled container 198 (only a part of which is shown in FIG. 12). This cap member 106" includes an outwardly extending flange 200, which is sealingly captured against an end edge 202 of the bottle neck 196 by an annular nut 204. This type of container will ordinarily be filled and closed for shipment with a conventional threaded cap (not shown). The user of the female coupling part 20", to which a male coupling part 22 (not shown) will be connected in order to dispense the contents of the bottle 198, will remove the conventional cap and replace it with the female coupling part 20". This female coupling part 20" is held sealingly in place on the bottle 198 with the nut 204. Thereafter, the bottle 198 is laid on its side or is inverted in order to dispense the liquid contents of this bottle.

FIG. 13 depicts another alternative embodiment of the female coupling part 20''', which is outwardly configured to be forcefully received sealingly in the bung hole 206 of a conventional drum or barrel 208 (only a part of which is depicted in FIG. 13). While the bung hole of particular barrels or drums may have slightly different configurations, the typical drum illustrated in FIG. 13 includes a metallic or plastic, for example, diaphragm portion 210, which may form the drum head, or a part of the drum head, for the drum 208. This metallic diaphragm 210 defined a bung hole 206 around which a flange portion 212 of the metallic diaphragm 210 is flared to provide a tapering entrance section 214 for the bung hole 206. It will be understood the that use of the term "drum" in the present disclosure is illustrative only and is not limiting of the invention. In fact, the configuration of female coupling part 20''' shown in FIG. 13 may be used with a variety of fluid storage or fluid transport vessels. For example, the coupling part 20''' may be used with vessels such as barrels, pails, tanks, or virtually any other configuration of vessel having an aperture into which the coupling part 20''' may be sealingly inserted. The cap member 106''' is outwardly configured with a tapering introducing surface 216 leading to a circumferential groove 218, which is backed by an outer flange 220.

With a female coupling part 20''' configured as shown in FIG. 13, the user removes the conventional stopper from the bung hole 206 of the drum 208, and introduces the cap member surface 216 against the entrance surface 214. At this point, a mallet, for example, will be used to force the cap member 106''' into the bung hole 206 to seat the groove 218 in the hole 210. The outer flange portion 220 prevents the cap member 106''' from being driven all the way into the drum 208. After the drum is tapped in this way, a male coupling part (not shown) may be connected with the female coupling part 20''', and the drum is rolled so that the bung hole 206 is at a low point of the drum for dispensing the fluid contents of this drum.

FIG. 14 depicts another alternative embodiment of the present invention in which the female coupling part is configured to engage sealingly onto the neck of a conventional rigid-walled container, such as a glass or plastic bottle. Because the general features of the invention are by now familiar to the reader, the use of primes is discontinued, and the same reference numerals used above are used with respect to the embodiment of FIG. 14 to indicate the same feature or features which are analogous in structure or function. Viewing FIG. 14, it is seen that the female coupling part 20 is configured to snap onto the neck 222 of a conventional rigid-walled bottle 224. The neck 222 of bottle 224 includes a radially outwardly extending circumferential ridge 226, while the cap member 106 includes a skirt portion 110 analogous in function to the skirt 110 of the embodiment of the invention first described above. The skirt portion 110 of the cap member 110 seen in FIG. 14 defines a radially inwardly opening circumferential recess 118 which sealingly receives the ridge 110, as is indicated in FIG. 14. It will be understood that the cap member 106 is formed of resiliently shape-retaining material which is deformable with the application of sufficient force to allow the cap member 110 to snap onto the neck 222 of the bottle 224.

Finally, FIG. 15 depicts an alternative embodiment of the present invention in which the male coupling part 22 is modified in comparison to the male coupling part described above in order to allow a slightly altered functional cooperation among the male and female coupling parts. The female coupling part for use with the male coupling part depicted in FIG. 15 may be the same as that shown and described above. Viewing FIG. 15, it is seen that the probe member 60 is slightly elongated, and that the hose barb member 42 defines a second outer axially extending annular recess 230. Within the recess 230 and extending axially along the probe member to bear against the sleeve member 88 is a coil compression spring 232. The recess 230 is dimensioned such that the coil spring is completely received into the recess when the sleeve member is slid to its second position against the hose barb member 42. However, this coil spring 232 resiliently biases the sleeve member 88 to its first closed position across the apertures 66 so that the resilient retention of the sleeve member 88 in this position (which was employed in the embodiment described above) is not necessary. In other words, the sleeve member 88 is formed without the inner circumferential groove 105. The O-ring sealing member 72 simply engages sealingly into the sleeve member 88 in the closed position of this sleeve member, as is illustrated in FIG. 15.

In use of the male coupling part 22, as depicted in FIG. 15, the user inserts it into a female coupling part 20, just as was described above with respect to the first embodiment of the invention. In this case, the user must apply sufficient force to compress the coil spring 232, moving the sleeve 88 to its second position as the male coupling part 22 enters the female coupling part 20. Engagement of the pawl 40 with the flange 48 of the female coupling part 20 ensures continued engagement of the coupling parts despite the spring force from spring 232. When the user is ready to disconnect the coupling parts, the pawl 40 is released, and the spring 232 will assist in disconnecting the coupling parts as it moves sleeve member 88 across the apertures 66 to its first closed position. The user will simultaneously apply an axial withdrawing force to the male coupling part 22 so that the sleeve 88 is withdrawn from the bore 142 to separate the coupling parts.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. For example, the present coupling parts can be used with fluids other than food products. These coupling parts could be used with liquids such as chemicals. Photographic chemicals are an example of a liquid other than a food product with which the present coupling parts could be used. Also, the present coupling invention can be used with other types of vessels in addition to those depicted, described, or referred to specifically herein. For example, bag type vessels can be used with the present coupling parts even if the bag is not disposed in a box. The present coupling parts can also be used to effect fluid communication between a pair of conduits or a pair of vessels, for example, instead of just between a vessel and a conduit as depicted. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A two-part coupling structure having a female coupling part for fluid flow communication with a vessel, and a male coupling part for fluid flow communication with a conduit, said coupling parts being mutually engageable to effect fluid flow communication between said vessel and said conduit, and being disengageable to both discontinue said fluid flow communication and also to mutually close fluid flow communication between ambient and each of said vessel and conduit; said two-part coupling structure comprising:

said female coupling part having:

a yieldably shape-retaining female cap member defining a through bore communicating between ambient and said vessel, and a radially inwardly opening circumferential groove on said through bore spaced outwardly of said vessel along said through bore;

a yieldably shape-retaining disk-like plug member having a wall portion for spanning and closing said through bore of said cap member, said plug member including a circumferential ring portion which is sealingly receivable forcefully into said through bore of said cap member in an axial direction outwardly of said vessel, and said ring portion radially outwardly defining a circumferential ridge receivable into said circumferential groove of said cap member to lock said plug member into sealing relation therewith, said ring portion further defining an inner radially inwardly opening circumferential groove;

said cap member and said plug member cooperating to define a first axial force for engagement of said plug member ring portion into said through bore of said cap member, and an oppositely directed second axial force for disengagement of said plug member from said cap member removing said plug member inwardly of said vessel from said through bore of said cap member;

said male coupling part having:

an elongate yieldably shape-retaining probe member defining a blind axial passage for fluid flow communication with said conduit and a wall portion closing said axial passage adjacent a forward end of said probe member, said probe member defining a stepped outer diameter with an enlarged-diameter forward flange portion of a size to be received into said plug member ring portion, said forward flange portion defining a radially outer circumferential rib receivable into said inner groove of said ring portion, and also cooperating with a smaller-diameter portion of said probe member to define a rearwardly-disposed shoulder, said probe member defining a lateral aperture opening from said blind passage outwardly on said smaller-diameter portion rearwardly of and adjacent to said shoulder;

a yieldably shape-retaining sleeve member carried slidably on said smaller-diameter portion of said probe member between a first position across and closing said lateral aperture and a second position at least partially rearwardly of and opening said lateral aperture, said sleeve member having a stepped outer diameter with an elongate smaller-diameter portion of a size to be received closely into said through bore of said cap member, said sleeve member having a circumferential axially-disposed forward end edge surface engageable in said first position of said sleeve member with said shoulder of said probe member flange portion, and further having a larger-diameter radially outwardly extending flange portion at a rear end thereof opposite to said forward end edge, said flange portion of said sleeve member being engageable with said cap member to slide said sleeve member from said first position to said second position thereof, said sleeve member also outwardly carrying resilient sealing means for sealingly engaging retainingly into said circumferential groove of said cap member substantially simultaneously with said flange portion of said sleeve member engaging said cap member;

said probe member and said plug member cooperatively defining a third axial force for engagement of said probe member flange portion into said plug member ring portion, which third axial engagement force is less than said second axial force for disengagement of said plug member from said cap member; upon insertion of said male coupling part into said female coupling part said probe member first sequentially engaging with said plug member and then disengaging said plug member from said cap member for movement of said plug member inwardly of said vessel with said inserting probe member, said sleeve member engaging said cap member and moving to said second position thereof relative to said inserting probe member to uncover said lateral aperture and to open fluid flow communication between said vessel and said conduit;

said probe member and said plug member cooperatively defining a fourth axial force for disengagement of said probe member from within said ring portion of said plug member which is greater than said first axial force necessary to engage said plug member ring portion into said bore of said cap member, so that upon withdrawal of said male coupling part from said female coupling part said plug member first sequentially re-engages with said cap member followed by said probe member disengaging from said plug member, said resilient sealing means retaining and relatively moving said sleeve member forwardly along said withdrawing probe member to said first position thereof to re-close said lateral aperture, and said shoulder of said enlarged-diameter flange portion of said withdrawing probe member engaging said sleeve member to overcome said resilient retention and remove said sleeve member axially outwardly from within said cap member.

2. The two-part coupling structure of claim 1 wherein said plug member includes said circumferential ridge being defined by the cooperation of a forwardly tapering surface and a rearwardly tapering surface on said ring portion thereof.

3. The two-part coupling structure of claim 2 wherein said forwardly and said rearwardly tapering surfaces for said ridge have differing taper angles.

4. The two-part coupling structure of claim 1 wherein said inner radially inwardly opening circumferential groove of said plug member ring portion is defined by the cooperation of a forwardly tapering and a rearwardly tapering surface within said ring portion thereof.

5. The two-part coupling structure of claim 4 wherein said forwardly and said rearwardly tapering surfaces for said inner groove have differing taper angles.

6. The two-part coupling structure of claim 1 wherein said female cap member further defines means for sealingly mounting to a neck of a rigid bottle.

7. The two-part coupling structure of claim 6 wherein said means for mounting sealingly to a rigid bottle includes said cap member defining a radially outwardly extending flange, and an annular nut for threadably engaging the bottle neck to sealingly dispose said cap member therein.

8. The two-part coupling structure of claim 7 wherein said means for mounting sealingly to a rigid bottle includes said cap member defining an axially extending skirt, said axially extending skirt defining a radially inwardly opening circumferential groove for sealingly cooperating with a radially outer ridge at the neck of the bottle.

9. The two-part coupling structure of claim 1 wherein said female cap member includes means for mounting sealingly within a hole formed in a plastic bag for holding fluid.

10. The two-part coupling structure of claim 9 wherein said means for mounting said cap member in the plastic bag includes said cap member forming a radially outwardly extending flange portion, said flange portion sealingly fusing to a wall of the bag.

11. The two-part coupling structure of claim 1 wherein said cap member further includes means for being sealing received into an aperture of a vessel for holding liquid.

12. The two-part coupling structure of claim 11 wherein said means for sealingly receiving said cap member into a vessel aperture includes said cap member defining a tapering introducer surface leading to a radially outwardly opening radial groove configured for receiving a flared portion of the vessel around the aperture thereof.

13. The two-part coupling structure of claim 1 further including a fluid-holding bag having a tubular spout member carried thereon and defining a passage communicating with a chamber of said bag, said cap member and said spout member defining cooperating means for sealingly attaching to one another.

14. The two-part coupling structure of claim 13 wherein said cooperating means includes said cap member defining an axially-opening annular recess into which an end portion of said spout member is sealingly receivable.

15. The two-part coupling structure of claim 14 wherein said end portion of said spout member defines a radially extending circumferential ridge, said cap member defining a radially opening circumferential recess sealingly receiving said circumferential ridge of said spout member when the latter is sealingly received into said annular recess.

16. The two-part coupling structure of claim 15 wherein said end portion of said spout member defines both a radially inwardly extending circumferential ridge and a radially outwardly extending circumferential ridge, said cap member defining a corresponding radially inwardly opening recess and a radially outwardly opening circumferential recess each sealingly receiving a respective ridge of said spout member.

17. The two-part coupling structure of claim 13 wherein said spout member further includes a pair of axially spaced apart radially outwardly extending flanges cooperatively defining therebetween a radially opening groove for receiving a circumferential portion of a box into which said bag is received.

18. The two-part coupling structure of claim 1 wherein said cap member further includes a circumferential axially extending end portion, said plug member further including a radially outer skirt cooperating with the remainder of said plug member to define an axially extending annular recess, said end portion of said cap member being received into said annular recess when said plug member is sealingly engaged upon said cap member.

19. The two-part coupling structure of claim 1 wherein said sleeve member further carries resilient sealing means for sealingly engaging with said probe member and for resisting axial movement of said sleeve member along said probe member.

20. The two-part coupling structure of claim 19 wherein said resilient sealing means includes an O-ring type of sealing member carried inwardly of said sleeve member.

21. The two-part coupling structure of claim 1 wherein said probe member carries a resilient sealing feature disposed axially between said aperture and said rearwardly-disposed shoulder of said probe member, said sleeve member sealingly cooperating with said sealing feature in said first position of said sleeve member relative to said probe member.

22. The two-part coupling structure of claim 1 wherein said sleeve member further defines a shallow radially inwardly opening circumferential groove aligning with and partially receiving said resilient sealing feature in said first position of said sleeve member, said resilient sealing feature cooperating with said sleeve member to resiliently retain said sleeve member in said first position thereof.

23. The two-part coupling structure of claim 1 wherein said male coupling part further includes resilient means for biasing said sleeve member to said first position thereof.

24. The two-part coupling structure of claim 23 wherein said resilient biasing means includes said male coupling part carrying a coil spring engaging with said sleeve member to urge the latter to said first position thereof.

25. A two-part coupling structure comprising:

a female coupling part having a tubular cap member defining a through bore which forms a first fluid flow path for communicating with a vessel; and a plug member defining a wall portion for spanning and closing said through bore; said cap member and said plug member defining first cooperating means for removably attaching to one another in response to a first axial force so that said plug member wall closes fluid communication through said cap member and for disengaging from one another in response to an oppositely directed second axial force to free said plug member from said cap member allowing fluid flow through said first fluid flow path of said cap member bore;

a male coupling part having a elongate tubular probe member sealingly receivable axially into said through bore of said cap member, said probe member defining a second fluid flow path therein and a lateral opening from said second fluid flow path on an exterior surface of said probe member for communicating fluidly with said vessel, said probe member and said plug member defining second cooperating means for removably attaching to one another in response to a third axial force in the same direction and of lower level than said second axial force, and for disengaging from one another in response to a fourth axial force in the same direction and of a higher level than said first axial force, so that in response to forceful axial insertion of said male coupling part into said female coupling part said probe member engages with and attaches to said plug member prior to said plug member detaching from said cap member, and in response to axial withdrawing movement of said probe member from said cap member said plug member reattaches to said cap member prior to disengaging from said probe member;

a sleeve member which is carried on said probe member and sealingly engageable within said cap member, said sleeve member sliding along said probe member between a first position across and closing said lateral opening of said second flow path and a second position opening said second flow path; said sleeve member and said probe member defining cooperating frictional means for retaining said sleeve member in each of said first and said second positions; and said sleeve member and said cap member defining cooperating means for sliding said sleeve member to said second position thereof in response to insertion of said male coupling part into said female coupling part to open said flow path communication with said vessel, and for sliding said sleeve member from said second position to said first position thereof to close said flow path in response to withdrawal of said male coupling part from said female coupling part.

26. The two-part coupling structure of claim 25 wherein said cooperating frictional means defined by said sleeve member and said probe member for retaining said sleeve member in each of said first and said second positions includes said probe member defining an outer surface along which said sleeve member is slidably movable, said sleeve member inwardly carrying a sealing member which both sealingly engages with said probe member at said outer surface thereof and also frictionally engages said outer surface to resist axial relative movement of said sleeve member until a certain axial force has been applied.

27. The two-part coupling structure of claim 25 wherein said cooperating means defined by said sleeve member and said cap member for sliding said sleeve member to said second position thereof in response to insertion of said male coupling part into said female coupling part to open said flow path communication with said vessel includes said sleeve member defining an outwardly radially extending flange portion which upon insertion of said male coupling part into said female coupling part engages said cap member to stop further inserting movement of said sleeve member, and to slide said sleeve member to said second position thereof relative to said probe portion upon further inserting movement of said male coupling part into said female coupling part.

28. A male coupling part having a elongate tubular probe member, said probe member being sealingly receivable axially into a through bore of a cap member of a female coupling part which defines a first fluid flow path communicating with a chamber of a fluid-storage vessel, said probe member defining a second fluid flow path therein and a lateral opening from said second fluid flow path on an exterior surface of said probe member near a forward end thereof for communicating fluidly with the vessel, a plug member of the female coupling part sealingly attaching removably to the cap member to close the fluid flow path therein in response to a first axial force, the plug member being detachable from the cap member to open fluid flow communication with the vessel in response to an oppositely-directed second axial force, said probe member and the plug member defining cooperating means for removably attaching to one another in response to a third axial force in the same direction and of lower level than said second axial force, and for disengaging from one another in response to a fourth axial force in the same direction as and of a higher level than said first axial force, so that in response to forceful axial insertion of said male coupling part into the female coupling part said probe member engages with and attaches to the plug member prior to the plug member detaching from said cap member, and in response to axial withdrawing movement of said probe member from the cap member the plug member reattaches to the cap member prior to disengaging from said probe member;

said male coupling part including a sleeve member which is carried on said probe member and sealingly engageable within the cap member, said sleeve member sliding along said probe member between a first position across and closing said lateral opening of said second flow path and a second position opening said flow path of said probe member; said sleeve member and said probe member defining cooperating frictional means for retaining said sleeve member in each of said first and said second positions; and said sleeve member defining an abutment surface for engaging the cap member to slide said sleeve member to said second position thereof in response to insertion of said male coupling part into the female coupling part thus to open said flow path communication with the vessel, and said sleeve member outwardly defining means for cooperating with said cap member to slide said sleeve member from said second position to said first position thereof to close said flow path in response to withdrawal of said male coupling part from said female coupling part.

29. A two-part coupling structure having a female coupling part and a male coupling part each with a respective fluid flow path therein, said coupling parts being removably engageable with one another for establishing fluid flow communication of said respective fluid flow paths, and being disengageable to both discontinue said fluid flow communication and also to mutually close fluid flow communication between ambient and each of said respective fluid flow paths; said two-part coupling structure comprising:

said female coupling part including:
a female cap member having a through bore defining a part of said respective fluid flow path;
a disk-like plug member having a wall portion for spanning said through bore of said cap member to close said respective fluid flow path;
said cap member and said plug member defining first cooperating means for sealingly engaging one another to close said respective fluid flow path of the cap member with said wall portion of said plug member, and also defining second cooperating means for removably attaching together and detaching from one another in response to respective oppositely-directed first and second axial forces;

said male coupling part including:
an elongate probe member having an axial passage defining said respective fluid flow path, and a wall portion closing said axial passage adjacent a forward end of said probe member, said probe member defining a stepped outer diameter with an enlarged-diameter forward flange portion cooperating with a smaller-diameter portion of said probe member to define a rearwardly-disposed shoulder, said probe member defining a lateral aperture opening outwardly from said axial passage on said smaller-diameter portion rearwardly of and adjacent to said shoulder;
a sleeve member carried slidably on said smaller-diameter portion of said probe member between a first position across and closing said lateral aperture and a second position at least partially rearwardly of and opening said lateral aperture, said sleeve member having an elongate cylindrical outer surface portion of a size to be received closely into said through bore of said cap member, said sleeve member having a forwardly-disposed circumferential end edge surface engageable in said first position of said sleeve member with said rearwardly-disposed shoulder of said probe member;
said sleeve member and said cap member defining third cooperating means for abutting one another to slide said sleeve member from said first position to said second position thereof in response to insertion of said male coupling part into said female coupling part;
said probe member and said plug member defining fourth cooperating means for removably attaching together and detaching from one another in response to respective oppositely-directed third and fourth axial forces, which third axial attaching force is less than said second axial force so that upon insertion of said male coupling part into said female coupling part said probe member first sequentially attaches with said plug member and then disengages said plug member from said cap member for movement of said plug member inwardly of said female coupling part along with said inserting probe member, said sleeve member abutting said cap member and moving to said second position thereof relative to said inserting probe member to uncover said lateral aperture and to open fluid flow communication between said respective flow paths; and which fourth axial force is greater than said first axial force so that upon withdrawal of said male coupling part from said female coupling part said probe member first sequentially re-engages said plug member with said cap member followed by said probe member detaching from said plug member;

one of said cap member and said male coupling part including for cooperation with said sleeve member fifth cooperating means for moving said sleeve member forwardly along said probe member to said first position thereof in response to withdrawal of said male coupling part from within said female coupling part to re-close said lateral aperture, and said rearwardly-disposed shoulder of said enlarged-diameter flange portion of said withdrawing probe member engaging said sleeve member to remove said sleeve member axially outwardly from within said cap member of said female coupling part.

30. A two-part coupling structure comprising:

a female coupling part having a tubular cap member defining a through bore which forms a first fluid flow path for communicating with a vessel; and a plug member defining a wall portion for spanning and closing said through bore; said cap member and said plug member defining first cooperating means for removably attaching to one another in response to a first axial force so that said plug member wall closes fluid communication through said cap member and for disengaging from one another in response to an oppositely directed second axial force to free said plug member from said cap member allowing fluid flow through said first fluid flow path of said cap member bore;

a male coupling part having a elongate tubular probe member sealingly receivable axially into said through bore of said cap member, said probe member defining a second fluid flow path therein and a lateral opening from said second fluid flow path on an exterior surface of said probe member for communicating fluidly with said vessel, said probe member and said plug member defining second cooperating means for removably attaching to one another in response to a third axial force in the same direction and of lower level than said second axial force, and for disengaging from one another in response to a fourth axial force in the same direction and of a higher level than said first axial force, so that in response to forceful axial insertion of said male coupling part into said female coupling part said probe member engages with and attaches to said plug member prior to said plug member detaching from said cap member, and in response to axial withdrawing movement of said probe member from said cap member said plug member reattaches to said cap member prior to disengaging from said probe member;

a sleeve member which is carried on said probe member and sealingly engageable within said cap member, said sleeve member sliding along said probe member between a first position across and closing said lateral opening of said second flow path and a second position opening said second flow path; said sleeve member and said probe member defining cooperating frictional means for retaining said sleeve member in each of said first and said second positions; and said sleeve member and said cap member defining cooperating means for sliding said sleeve member to said second position thereof in response to insertion of said male coupling part into said female coupling part to open said flow path communication with said vessel, and for sliding said sleeve member from said second position to said first position thereof to close said flow path in response to withdrawal of said male coupling part from said female coupling part;

wherein said first cooperating means for removably attaching said tubular cap member and said plug member to one another in response to a first axial force so that said plug member wall closes fluid communication through said cap member and for disengaging from one another in response to an oppositely directed second axial force to free said plug member allowing fluid flow through said first fluid flow path of said cap member bore comprises said plug member defining an axially extending ring portion, said ring portion having an outer circumferential ridge defined by the cooperation of a forwardly and a rearwardly tapering surfaces, said cap member having an end portion and said bore of said cap member having a radially inwardly opening groove for receiving said ridge of said plug member ring portion, said cap member groove having a rearwardly tapering wall surface, whereby said forwardly tapering surface of said plug member ring portion engages said end portion to resiliently deflect into said cap member bore upon application of said first axial force, and said rearwardly tapering surface of said plug member ring portion engages said rearwardly tapering wall surface of said cap member to retain said plug member ring portion within said cap member bore until said second axial force is applied to said plug member.

31. The two-part coupling structure of claim 30 wherein said male coupling part further carries a coil spring engaging with said sleeve member to urge the latter toward said first position thereof.

32. A two-part coupling structure comprising:

a female coupling part having a tubular cap member defining a through bore which forms a first fluid flow path for communicating with a vessel; and a plug member defining a wall portion for spanning and closing said through bore; said cap member and said plug member defining first cooperating means for removably attaching to one another in response to a first axial force so that said plug member wall closes fluid communication through said cap member and for disengaging from one another in response to an oppositely directed second axial force to free said plug member from said cap member allowing fluid flow through said first fluid flow path of said cap member bore;

a male coupling part having a elongate tubular probe member sealingly receivable axially into said through bore of said cap member, said probe member defining a second fluid flow path therein and a lateral opening from said second fluid flow path on an exterior surface of said probe member for communicating fluidly with said vessel, said probe member and said plug member defining second cooperating means for removably attaching to one another in response to a third axial force in the same direction and of lower level than said second axial force, and for disengaging from one another in response to a fourth axial force in the same direction and of a higher level than said first axial force, so that in response to forceful axial insertion of said male coupling part into said female coupling part said probe member engages with and attaches to said plug member prior to said plug member detaching from said cap member, and in response to axial withdrawing movement of said probe member from said cap member said plug member reattaches to said cap member prior to disengaging from said probe member;

a sleeve member which is carried on said probe member and sealingly engageable within said cap member, said sleeve member sliding along said probe member between a first position across and closing said lateral opening of said second flow path and a second position opening said second flow path; said sleeve member and said probe member defining cooperating frictional means for retaining said sleeve member in each of said first and said second positions; and said sleeve member and said cap member defining cooperating means for sliding said sleeve member to said second position thereof in response to insertion of said male coupling part into said female coupling part to open said flow path communication with said vessel, and for sliding said sleeve member from said second position to said first position thereof to close said flow path in response to withdrawal of said male coupling part from said female coupling part;

wherein said second cooperating means for removably attaching said probe member and said plug member to one another in response to a third axial force in the same direction and of lower level than said second axial force, and for disengaging said probe member and said plug member from one another in response to a fourth axial force in the same direction and of a greater level than said first axial force includes said plug member including a ring portion defining an inner circumferential groove defined by the cooperation of respective forwardly and rearwardly tapering surfaces, said probe member having an enlarged-diameter flange portion receivable into said ring portion of said plug member, and said probe member flange portion having an outer rib defined by the cooperation of respective forwardly and rearwardly tapering surfaces, upon engagement of said flange portion of said probe member with said ring portion of said plug member the forwardly tapering surfaces of said probe member engaging said ring portion to allow said rib to enter said inner groove with application of said third axial force, and said rearwardly tapering surfaces of said probe member and said plug member ring portion engaging one another to retain said plug member upon said probe member until said fourth axial force is applied in a disengaging direction.

33. The two-part coupling structure of claim 32 wherein said male coupling part further carries a coil spring engaging with said sleeve member to urge the latter toward said first position thereof.

34. A two-part coupling structure comprising:

a female coupling part having a tubular cap member defining a through bore which forms a first fluid flow path for communicating with a vessel; and a plug member defining a wall portion for spanning and closing said through bore; said cap member and said plug member defining first cooperating means for removably attaching to one another in response to a first axial force so that said plug member wall closes fluid communication through said cap member and for disengaging from one another in response to an oppositely directed second axial force to free said plug member from said cap member allowing fluid flow through said first fluid flow path of said cap member bore;

a male coupling part having a elongate tubular probe member sealingly receivable axially into said through bore of said cap member, said probe member defining a second fluid flow path therein and a lateral opening from said second fluid flow path on an exterior surface of said probe member for communicating fluidly with said vessel, said probe member and said plug member defining second cooperating means for removably attaching to one another in response to a third axial force in the same direction and of lower level than said second axial force, and for disengaging from one another in response to a fourth axial force in the same direction and of a higher level than said first axial force, so that in response to forceful axial insertion of said male coupling part into said female coupling part said probe member engages with and attaches to said plug member prior to said plug member detaching from said cap member, and in response to axial withdrawing movement of said probe member from said cap member said plug member reattaches to said cap member prior to disengaging from said probe member;

a sleeve member which is carried on said probe member and sealingly engageable within said cap member, said sleeve member sliding along said probe member between a first position across and closing said lateral opening of said second flow path and a second position opening said second flow path; said sleeve member and said probe member defining cooperating frictional means for retaining said sleeve member in each of said first and said second positions; and said sleeve member and said cap member defining cooperating means for sliding said sleeve member to said second position thereof in response to insertion of said male coupling part into said female coupling part to open said flow path communication with said vessel, and for sliding said sleeve member from said second position to said first position thereof to close said flow path in response to withdrawal of said male coupling part from said female coupling part;

wherein said cooperating means defined by said sleeve member and said cap member for sliding said sleeve member to said second position thereof in response to insertion of said male coupling part into said female coupling part to open said flow path communication with said vessel includes said sleeve member defining an outwardly radially extending flange portion which upon insertion of said male coupling part into said female coupling part engages said cap member to stop further inserting movement of said sleeve member, and to slide said sleeve member to said second position thereof relative to said probe portion upon further inserting movement of said male coupling part into said female coupling part; and wherein said cooperating means defined by said sleeve member and said cap member for sliding said sleeve member from said second position to said first position thereof to close said flow path in response to withdrawal of said male coupling part from said female coupling part includes said sleeve member carrying outwardly thereon a resilient sealing and retention member, said cap member defining a radially inwardly opening groove for receiving said resilient sealing and retention member, said retention member expanding radially into said groove of said cap member and resisting removal therefrom until a determined level of axial force is applied to withdraw said male coupling part from said female coupling part.

35. The two-part coupling structure of claim 34 wherein said male coupling part further carries a coil spring engaging with said sleeve member to urge the latter toward said first position thereof.

* * * * *